US006844976B1

(12) United States Patent
Firon et al.

(10) Patent No.: US 6,844,976 B1
(45) Date of Patent: Jan. 18, 2005

(54) HEAT-ABSORBING FILTER AND METHOD FOR MAKING SAME

(75) Inventors: Muriel Firon, St Cheron (FR); Eric Monterrat, Fondettes (FR); Jérôme Monnot, Menestreau en Vilette (FR)

(73) Assignee: Commissariat a l'Energie Atomique, Paris (FR)

(*) Notice: Subject to any disclaimer, the term of this patent is extended or adjusted under 35 U.S.C. 154(b) by 238 days.

(21) Appl. No.: 10/130,277

(22) PCT Filed: Nov. 24, 2000

(86) PCT No.: PCT/FR00/03280

§ 371 (c)(1),
(2), (4) Date: May 28, 2002

(87) PCT Pub. No.: WO01/38246

PCT Pub. Date: May 31, 2001

(30) Foreign Application Priority Data

Nov. 26, 1999 (FR) .............................. 99 14896

(51) Int. Cl.[7] .............................................. G02B 1/10
(52) U.S. Cl. ...................... 359/586; 359/577; 359/588; 359/589
(58) Field of Search ................................ 359/577–590, 359/359–361

(56) References Cited

U.S. PATENT DOCUMENTS

| | | | | | |
|---|---|---|---|---|---|
| 4,507,547 | A | * | 3/1985 | Taga et al. ................... | 219/543 |
| 4,581,280 | A | | 4/1986 | Taguchi et al. | |
| 5,138,219 | A | * | 8/1992 | Krisl et al. ................... | 313/112 |
| 5,179,468 | A | * | 1/1993 | Gasloli ........................ | 359/359 |
| 5,341,238 | A | * | 8/1994 | Trost et al. .................. | 359/359 |
| 5,360,659 | A | * | 11/1994 | Arends et al. ............... | 428/216 |
| 5,667,880 | A | | 9/1997 | Okaniwa | |
| 5,897,957 | A | | 4/1999 | Goodman | |
| 5,965,246 | A | * | 10/1999 | Guiselin et al. ............. | 428/212 |
| 6,259,202 | B1 | * | 7/2001 | Sturm et al. ................. | 313/504 |

FOREIGN PATENT DOCUMENTS

| | | |
|---|---|---|
| GB | 2 116 590 | 9/1983 |
| GB | 2 324 098 | 10/1998 |

* cited by examiner

*Primary Examiner*—Leo Boutsikaris
(74) *Attorney, Agent, or Firm*—Oblon, Spivak, McClelland, Maier & Neustadt, P.C.

(57) ABSTRACT

The present invention relates to a heat filter and a process for manufacturing this filter.

This heat filter may for example be used to filter surgical or examination lighting composed of a light source which emits energy, or radiation, in the visible and infrared ranges. It allows the light emitted by this source to be filtered so as to prevent infrared radiation from hindering the surgical team or the patient.

It includes a substrate, at least one layer of an infrared reflecting material, and a coating forming an interference filter in the visible range.

The invention process includes the deposition on a substrate of a layer of an infrared reflecting material and the deposition on this layer of an interference filter in the visible range.

38 Claims, 9 Drawing Sheets

HEAT-ABSORBING FILTER AND METHOD FOR MAKING SAME

TECHNICAL FIELD

This invention relates to a heat filter and a process for manufacturing this filter.

A heat filter may for example be used to filter surgical lighting composed of a light source that emits energy or radiation in the visible and infrared ranges. It must be capable of filtering light emitted by this source in order to prevent infrared radiation from hindering the operating team or the patient.

This filter must block the longest wavelengths, while remaining neutral in terms of the perception of colours by the human eye within the visible range. The shortest wavelengths may also be absorbed or reflected by the filter.

Apart from medical lighting, this type of filter can also be used for an examination lamp, an office lamp, an optical fibre lighting system, glazing, an optical projection system, a bulb, etc.

PRIOR ART

Within the context of an operating theatre lighting or "surgical lighting" application, this type of filter is made from a doped glass opaque to infrared radiation.

The transmission spectrum for this doped glass in respect of a thickness of 3 mm is given in the appended FIG. 1, with the reference 1, and compared with the transmission spectrum for an ordinary 3 mm thick glass with the reference 3. In this figure, the axis of the y-coordinates represents the internal transmission T and the axis of the x-coordinates represents the wavelength $\lambda$ in nm.

A multi-layer treatment of this doped glass on which $SiO_2$ and $Nb_2O_5$ layers will be deposited is a means of improving its transmission in the visible range to make a heat filter hereinafter called a doped glass filter. The optical performance of this filter is shown in table 1 below:

TABLE 1

| Definition | Doped glass filter |
| --- | --- |
| Radiant energy RE ($mW/m^2/Lux$) | 4.25 |
| Average visible transmission Tvis (%) | 80.4 |
| Colour temperature Tcoul (K) | 3585 |
| Colour rendering index CRI or RA (CIE* standards) | 97.3 |
| R9 (CIE* standards) | 84.4 |

*Compagnie Internationale d'Eclairage = International Commission on Illumination Despite these good results, doped glass filters are expensive and do not operate well in a moist and warm environment. For example, in tropical countries, it is necessary to protect this filter from humidity and ultra-violet rays by an additional layer of $SiO_2$ which increases its manufacturing cost.

DISCLOSURE OF THE INVENTION

The purpose of this invention is specifically to overcome the disadvantages mentioned above, by supplying a heat filter with a low manufacturing cost and with the required properties in the visible range or in the range of the visible spectrum and in the infrared range.

This heat filter includes a substrate, at least one layer of infrared reflecting material, and a coating forming an interference filter in the visible range.

In particular, this invention supplies a heat filter including a substrate, a layer of infrared reflecting material covering at least one surface of the substrate, and a coating forming an interference filter in the visible range covering the said layer of infrared reflecting material.

The substrate may be a glass substrate such as transparent ordinary glass or plastic. For example, the transparency of a 2 mm thick glass substrate at 3 $\mu$m is about 30%.

When this substrate is made of plastic, in some cases it may be necessary for it to be resistant to temperatures of 200 to 300° C., particularly when the filter manufacturing technique includes treatments at these temperatures.

The infrared reflecting material may be a transparent conducting oxide, for example indium oxide doped with tin (ITO). These metal oxides are well known in the building industry, for example for glazing, since they are transparent to visible light and they reflect in the infrared range.

The level of infrared reflection and the transition wavelength between a dielectric behaviour (in other words transparent) and metallic (in other words reflecting) can be modified by varying the chemical composition of the transparent conducting oxide. For example, this is the case for ITO.

Document GB-A-2324098 describes a heat filter including a glass substrate, a layer of an infrared reflecting material, a coating forming an interference filter that includes a stack group of a first and second film with refractive indexes $n_1$ and $n_2$ repeated N times.

Document U.S. Pat. No. 5,341,238 describes a heat filter that includes a substrate, an ITO layer, a multi-layer interference filter and a second interference filter. The second filter is designed to reflect radiation in a narrow visible band, for example radiation of an HeNe laser.

According to the invention, indium oxide doped with tin may have an Sn/In ratio varying from about 9 to about 11% by weight, for example about 10% by weight. A ratio of about 10% by weight can give a maximum reflection level.

Other reflecting materials may be used, for example metals such as gold, silver or aluminium. But they are also reflecting in the visible, therefore it is necessary to deposit them in very thin layers, for example about 10 nm thick, to maintain sufficient transmission.

According to the invention, the coating forming an interference filter in the visible range may include at least one stacking group repeated N times containing at least one first film and at least one second film, in which the said stacking group consists of an alternation of the first film and the second film, the first film having a thickness L or multiple of L and being composed of a first material with a refractive index $n_1$, and the second film having a thickness H or multiple of H and being composed of a second material with a refractive index $n_2$, where N is a whole number and H and L are geometric thicknesses, and where N, H, L, $n_1$ and $n_2$ are such that the coating forming an interference filter has a transmission window of between 400 and 800 nm.

The definition of the geometric thickness is given assuming a thin film or layer deposited on an arbitrary substrate and a reference wavelength $\lambda_0$. This layer with thickness e has an index with value n for this reference wavelength. If the layer is illuminated with a source $I_0$ with wavelength $\lambda_0$, the part of the light radiation $I_1$ reflected at the first interface, in other words at the air-layer interface, will interfere with the part $I_2$ reflected at the second interface, in other words at the layer-substrate interface as shown in the appended FIG. 16.

The phase shift of the wave $I_2$ with respect to the wave $I_1$ is due to the passage through the layer and is equal to $$\frac{4\pi ne}{\lambda_0}\cos\theta.$$

If it is equal to $(2p+1)\pi$, where p is a whole number, and in so far as the value of the index of the substrate is less than the value of the index of the deposited layer, the interferences will be destructive and the reflection will be minimum at $\lambda_0$. For this wavelength, the layer is called the quarter wave layer and is denoted H if the index is high, or L if the index is low. $\theta$ is the angle formed by the ray refracted in the medium with index n. In general, a normal incidence is used and $\cos\theta$ is equal to 1.

If we set p=0, then $$\frac{4\pi ne}{\lambda_0}\pi$$

and the thickness of a quarter wave slice will be:

This thickness is denoted H if n is a high index and L if n is a low index.

The stack architecture is usually given in multiples of quarter wave films or layers, in other words what is called the geometric thickness. The advantage of this type of notation is that properties of the stack can be offset spectrally by changing only the value of the reference wavelength, provided that the index n is constant between the two wavelengths.

For example, in the interference coating, the first material may be $SiO_2$ and the second material may be $TiO_2$. Also for example, the first material may be $SiO_2$ and the second material may be $Si_3N_4$. Any other pair of materials that acts like a dielectric and has different index values is acceptable.

When $SiO_2$ and $TiO_2$ are used, the coating forming an interference filter in the visible range may include a first stack layer with an 0.5L/H/0.5L type alternation repeated 8 times. It may also include a second stack group with an 0.65L/1.3H/0.65L type alternation repeated 8 times.

For example, in the heat filter, the substrate may be a glass substrate, the transparent conducting oxide layer may be an indium oxide layer doped with tin, and the coating forming an interference filter in the visible range may be a stack in which there is an alternation of $SiO_2$ films and $TiO_2$ films, the stack beginning with an $SiO_2$ film deposited on the ITO layer and terminating with a $TiO_2$ film in contact with the atmosphere, said stack including 17 $SiO_2$ films and 16 $TiO_2$ films.

In the case of $SiO_2$ and $Si_3N_4$, the coating forming an interference filter in the visible range includes a first stack group with an 0.5L/H/0.5L type alternation repeated 6 times. It may also include a second stack group with an 0.65L/1.3H/0.65L type alternation repeated 6 times.

The heat filter may also include an anti-reflection layer and/or a scratch resistant layer.

The filter in this invention may for example be used in an optical system such as lighting for an operating theatre, an examination lamp, a lamp, an office lamp, an optical fibre lighting system, glazing, an optical projection system, a bulb, etc. Therefore this invention also relates to this type of system including a filter complying with the filter in this invention, for example lighting for an operating theatre, an examination lamp, for example in respect of medical care or beauty care, etc.

The light source may for example be a filament bulb, a halogen lamp, an incandescent lamp, etc.

This invention is also applicable to a process for manufacturing a heat filter including a substrate, at least one layer of an infrared reflecting material and a coating forming an interference filter in the visible range.

This process includes steps consisting in:
 a) supplying a substrate,
 b) depositing a layer of an infrared reflecting material on at least one surface of said substrate,
 c) depositing a coating forming an interference filter in the visible range, on said layer of infrared material.

According to the invention, in the example in which the infrared reflecting material is indium oxide doped with tin (ITO), this material may be deposited by magnetron cathode sputtering on the substrate, for example from a sintered target with a composition of about 9 to about 11% by weight, for example about 10% by weight of tin oxide in $In_2O_3$. For ITO, the process according to the invention may also include a step $a_1$) in which the infrared reflecting material deposited on the substrate is annealed.

When the interference filter includes at least one stack group repeated N times as defined above, in which the first material is $SiO_2$ and the second material is $TiO_2$, the step c) of depositing an interference filter may be a film deposition step using a vacuum evaporation or cathode sputtering technique.

Deposition of thin films by vacuum evaporation is very frequently used to generate complex optical functions. Some automated items of equipment may be very useful for this invention since they are used to deposit multiple layers with four different materials.

Vacuum evaporation can for example be carried out using an electron gun. This device consists in deflecting an electron beam emitted by a filament in a crucible containing the material to be deposited. The target material is evaporated and then condenses on a substrate facing the crucible. This method is used to deposit different natures of materials such as oxides and metals.

The electron gun may for example be the EVA 1200 (trademark) model made by the Alliance Concept Company in France.

For oxides, it may be necessary to add oxygen into the chamber in order to improve the stoechiometry of the layers. The low working pressure of the order of $10^{-2}$ to $10^{-3}$ Pa allows thin film of high purity to be deposited. However, since the energy of the evaporated materials is less than 1 eV, in other words is relatively low, these layers frequently have a columnar type structure and are not very dense and do not bond very well.

This structure and the bond can be improved by irradiating the layer with an ion beam during its growth. The result is assisted evaporation. This ionic assistance may be reactive, for example when oxygen ions are used, or non reactive, for example when argon ions are used. The different deposition parameters such as the energy, temperature, partial pressures, flux or nature of the ions, contribute to optimising the optical properties of the deposited layers.

Cathode sputtering consists in making an electrical discharge in a gaseous medium using a rare or reactive gas between the cathode composed of the material to be deposited and the electrode at the nearest ground. The generated plasma ions bombard the target, and the pulverized compounds condense on the substrate.

Magnetron cathode sputtering is a high energy deposition process for sputtered compounds (a few eV). The bond of the deposited layers is often greater than the bond observed in the case of evaporation. However, the working pressure in the chamber is higher, of the order of 0.1 to 1 Pa, which can cause some pollution in the layers.

The structure of the films depends essentially on the pressure and the target-substrate distance. Furthermore, the oxide deposit makes it necessary to work either in radio frequency (in other words at about 13.56 MHz) or in direct current DC on a metallic target in a reactive environment.

In the first case, the deposition temperature is higher than in DC, of the order of 80° C., and the deposition rate is lower.

Cathode sputtering or magnetron cathode sputtering may for example be achieved by using a BAK 550 (trademark) type magnetron cathode sputtering machine made by the Balzers Company, LIECHTENSTEIN.

According to the invention, when the interference filter includes at least one stack group repeated N times as defined above, in which the first material is $SiO_2$ and in which the second material is $Si_3N_4$, the interference filter deposition step may be a film deposition step using a plasma deposition technique.

This invention applies particularly to the association of an infrared filter and a UV-visible filter that can be deposited on an ordinary glass substrate, and to the lighting performance level of this filter.

The filter in this invention makes it possible to filter the infrared radiation of illumination such as an incandescent lamp without disturbing the colour vision of the human eye.

The filter also enables good transmission in the visible spectral range. It avoids overheating of the observation area and guarantees good vision of colours and good efficiency measured as the light illumination power/electrical power.

Furthermore, its cost is much lower than the cost of prior art filters, since it uses a substrate that may be made of ordinary glass.

Other characteristics and advantages will appear in the description and examples given below, which are obviously given for illustrative purposes and are in no way restrictive, with reference to the appended figures.

EXAMPLES

Introduction

Figure 1:
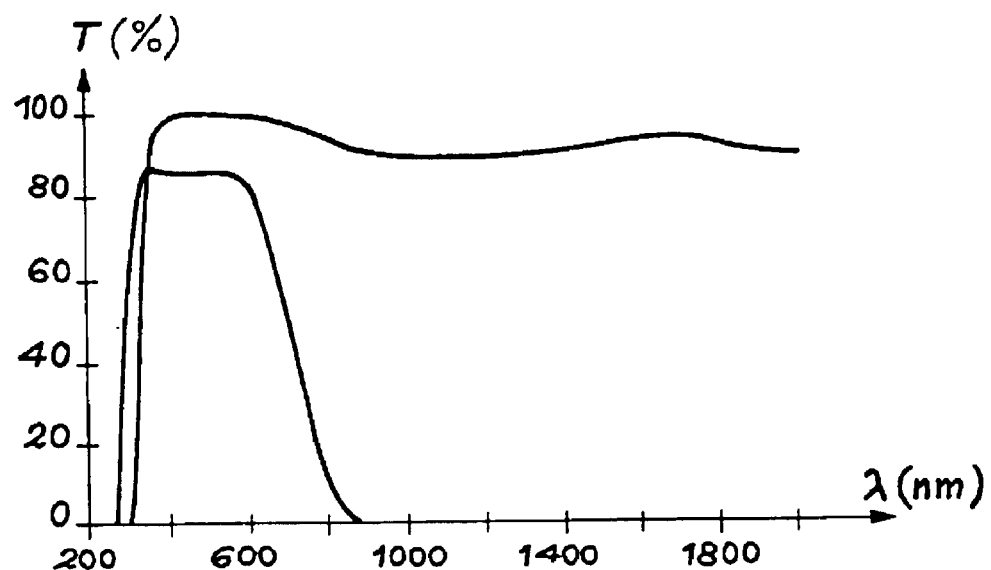
FIG. 1 shows a transmission spectrum for a doped type glass and a transmission spectrum for an ordinary glass.

The inventors started by separating the two spectral ranges. The following describes the approach that leads to defining the architecture of a purely dielectric stack to form the coating forming the interference filter in the visible range.

This heat filter according to the invention must for example satisfy the following specifications in the visible range:

radiant energy (infrared part of the total transmitted luminous intensity) less than 4.5 $mW/M^2$.Lux, visible transmission of the complete chain (luminous intensity transmitted in the visible spectrum range) greater than 60%, colour temperature of the optical chain: between 3500 and 4000 K, Colour Rendering Index (CRI): greater than 90, Colour rendering in reds ($R_9$): greater than 50.

The infrared filtration part is then treated with a material reflecting in this range. They start by presenting the optical properties of several of them, and then explain their choice.

Determination of Components of the Interference Filter in the Visible Range: Dielectric Filter The choice is limited to two different oxide type dielectric materials ($SiO_2$ and $TiO_2$), to simplify the manufacturing process. These two materials have a high index contrast, $\Delta n$=about 1, and there is no particular problem in procuring them. They are also frequently used in the optics industry and there is a large bibliography about them.

The different components were chosen based on different criteria:

high index contrast: the interference effects are significant and results may be achieved with fewer films, ease of procurement and costs: these materials are known in the industrial environment and are inexpensive.

Determination of Material Indexes

Refractive indexes and choice of deposition method.

Table 2 below summarizes the different deposition techniques that were tested for each single layer (SiO$_2$ TiO$_2$).

TABLE 2

Summary of the different deposition methods studied

| | Evaporation | Gaseous scanning | Ionic assistance | Nature of assistance |
|---|---|---|---|---|
| 1 | Simple | No | no | — |
| 2 | Reactive | Oxygen | No | — |
| 3 | Assisted | No | Yes | argon |
| 4 | Assisted Reactive | Oxygen | Yes | argon |
| 5 | Reactive Assisted | No | Yes | oxygen |
| 6 | Reactive Assisted Reactive | oxygen | yes | oxygen |

The optical properties of each individual SiO$_2$ or TiO$_2$ layer were determined by UV-Visible-Near IR spectroscopic ellipsometry.

This operation is facilitated by depositing the measured layers on silicon. Although silicon is not optimised in the visible range since it is difficult, at short wave lengths, to separate absorption due to the layer from absorption due to the substrate, its optical properties are well known and its opacity in the visible range means that there is no inconvenience due to reflections on the back of the substrate.

The model used most frequently to determine film characteristics is the Cauchy model, whose real index is expressed as follows:

$$n = A_n + B_n \lambda^{-2} + C_n \lambda^{-4}$$

The properties of a dielectric material can thus be found; a constant value of n at long wavelengths and a significant increase in this value when the wavelength reduces, in other words as the frequencies increase, they get closer to the value of the "gap" corresponding to the prohibited band energy. For materials whose absorption is not negligible and can be measured by ellipsometry, in other words for values of k of the order of $10^{-3}$ or more, the model of Urbach's tail can be used for a k decreasing exponentially from UV towards the longest wavelengths.

This gives:

$$k = A_k e^{1240 B_k \left( \frac{1}{\lambda} - \frac{1}{\lambda_0} \right)}$$

The coefficient 1240 is due to the fact that the inventors worked in nm, while the phenomenon is physically described in energy units (eV).

They attempted to superpose experimentally determined and calculated spectra as accurately as possible, by numerically adjusting the $A_n$, $B_n$, $C_n$, $A_k$, $B_k$ parameters.

The chosen deposition technique is the technique that can give optical characteristics of each material as close as possible to the characteristics of the solid materials, with the highest index contrast observable between the two oxides.

Figure 5:
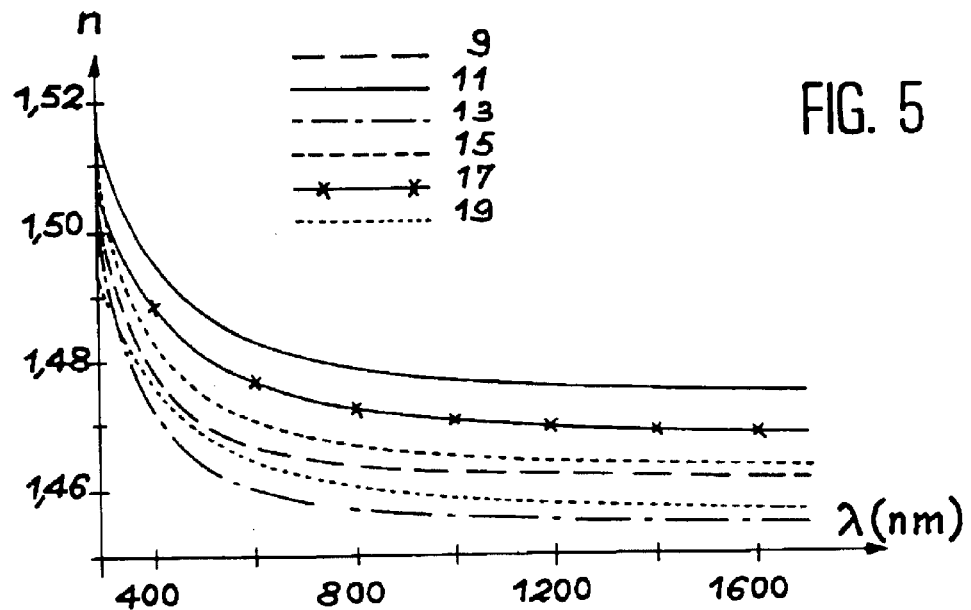
FIGS. 5 and 6 show the variation in refractive indexes determined by ellipsometry for $SiO_2$ and $TiO_2$ respectively, for different deposition methods.
Figure 6:
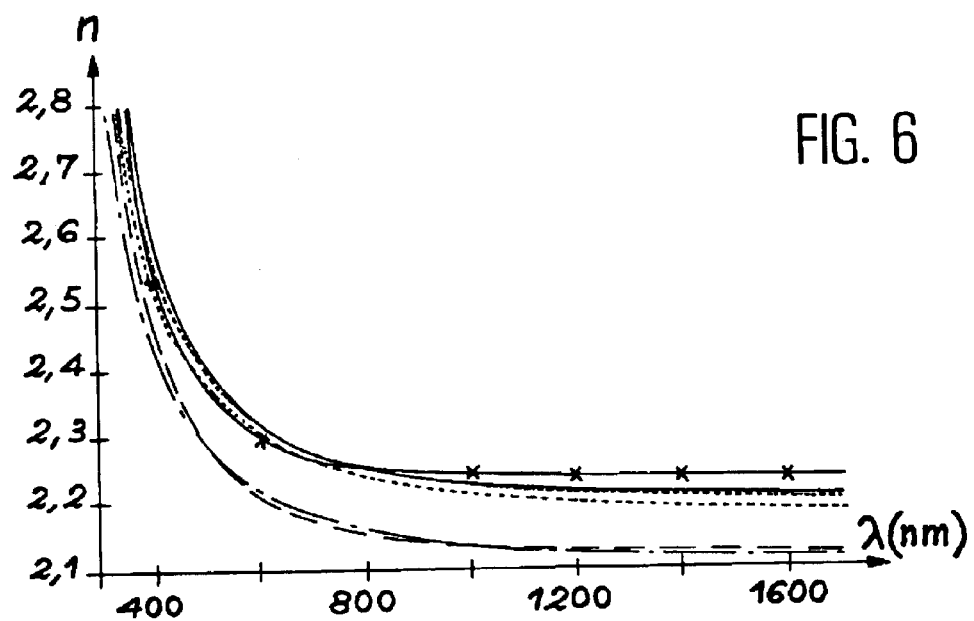

The results obtained on the different deposited layers are shown in FIGS. 5 and 6 for n and 7 for k.

Figure 7:
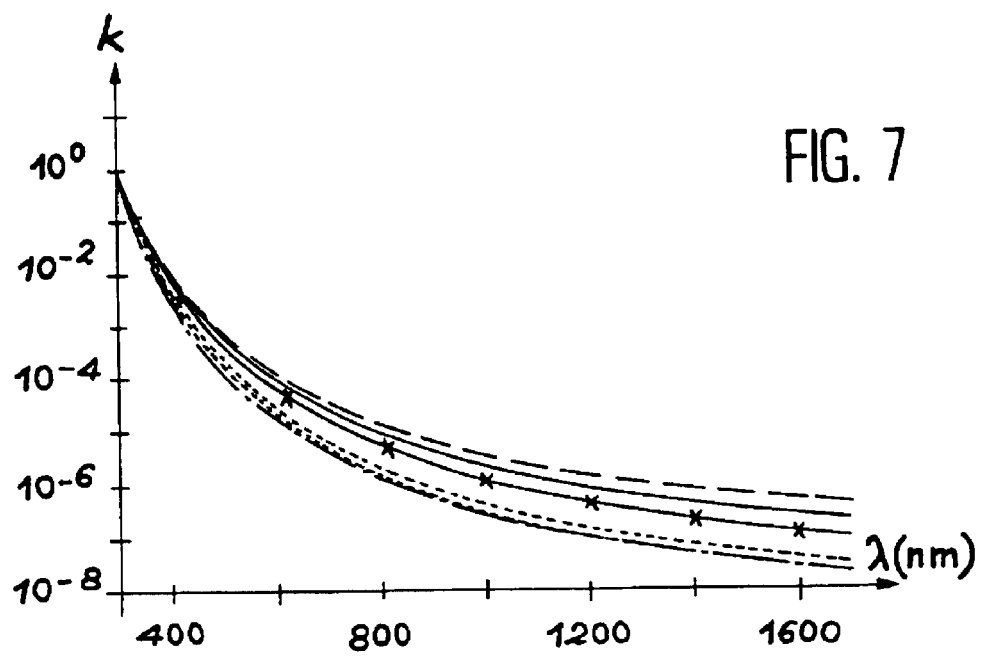
FIG. 7 shows the variation in the extinguishing coefficient k determined by ellipsometry for $TiO_2$ for different deposition methods.

In FIGS. 5 and 6, the axis of the x-coordinates indicates the wavelength λ in nm, the axis of the y-coordinates indicates the refractive index n of the material, and in FIG. 7 it shows the coefficient k. FIG. 5 was made with SiO$_2$ and FIG. 6 with TiO$_2$. The legend indicated in FIG. 5 is also valid for FIGS. 6 and 7.

The reference 9 indicates simple evaporation, reference 11 assisted evaporation, reference 13 reactive evaporation, reference 15 assisted reactive evaporation, reference 17 reactive assisted evaporation and reference 19 a reactive assisted reactive evaporation.

For silicon oxide, it should be noted that the value of the absorption coefficient k of SiO$_2$ cannot be measured by ellipsometry since it is less than $10^{-3}$, therefore we set $k_{SIO2}=0$. The refractive index of SiO$_2$ varies little as a function of the deposition conditions; it varies from 1.46 to 1.485 at 600 nm.

However, the smallest values of n and the values closest to the values of the solid material are obtained in the case of simple evaporation, assisted evaporation, reactive evaporation and reactive assisted reactive evaporation.

In the case of TiO$_2$, the smallest values of n are observed for simple evaporation and reactive evaporation. This is the highest index contrast that has to be achieved; the chosen method is, therefore, either assisted evaporation or reactive assisted reactive evaporation.

Furthermore, the absorption of titanium oxide layers is lowest for reactive evaporation, assisted reactive evaporation and reactive assisted reactive evaporation.

By process of elimination, the method chosen is reactive assisted reactive evaporation. This approach is the best compromise between a good index contrast and weak absorption of TiO$_2$. In order to optimise the index for TiO$_2$, the energy of the ions irradiating the film or the layer during growth was increased using an ion gun.

Figure 8:
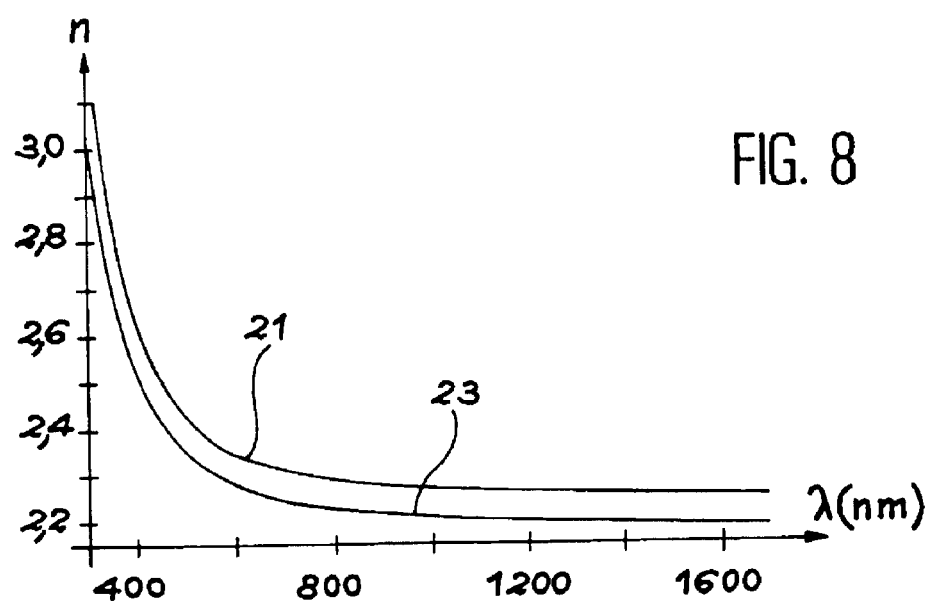
FIG. 8 shows the variation in the refractive index as a function of the voltage of the ion gun for $TiO_2$ deposition.

FIG. 8 shows the variation in the refractive index as a function of the voltage of the ion gun. In this figure, the axis of the x-coordinates indicates the refractive index n and the axis of the y-coordinates represents the wavelength λ in nm. In this figure, the reference 21 indicates the curve obtained with a voltage applied to the ion gun equal to 100 V and 2 A, and reference 23 shows the curve for 160 V and 2 A.

When the gun voltage increases, the index increases. If the power is increased further, competition is initiated between material deposition and its erosion by the ions. Furthermore, higher energy can generate defects that are sources of absorption.

Therefore, the indexes of films or individual layers were determined by ellipsometry using the Cauchy model. The following parameters were obtained:

| | $A_n$ | $B_n$ | $C_n$ |
|---|---|---|---|
| SiO$_2$ | 1.455 | 3.33 × 10$^{-3}$ | 0 |
| TiO$_2$ | 2.262 | 1.39 × 10$^{-2}$ | 4.1 × 10$^{-3}$ | where $A_n$, $B_n$, and $C_n$ are the Cauchy parameters for these materials.

The values of the parameters obtained for the TiO2 absorption coefficient k were as follows:

$A_k = 4.1 \times 10^{-3}$, $B_k = 5.7$, $\lambda_0 = 0.4$ μm

These parameters give a value of $k = 4.1 \times 10^{-3}$ at 400 nm.

When the index values of the individual layers had been determined, the dielectric filter could be made.

Calculation of the Interference Filter in the Visible Range

The inventors chose to deal with the problem in two steps: the first step relates to the visible range and the second applies to the infrared range. The specifications given above for each of these two ranges were determined from an ideal film on the complete spectrum from 300 to 3000 nm and have a non-negligible influence on each other.

They dealt with the visible range and determined the characteristics of a filter such that they meet a number of specifications specific to this spectral range ($T_{VIS}$, $T°_{COUL}$). These characteristics were reviewed after the second step.

Figure 2:
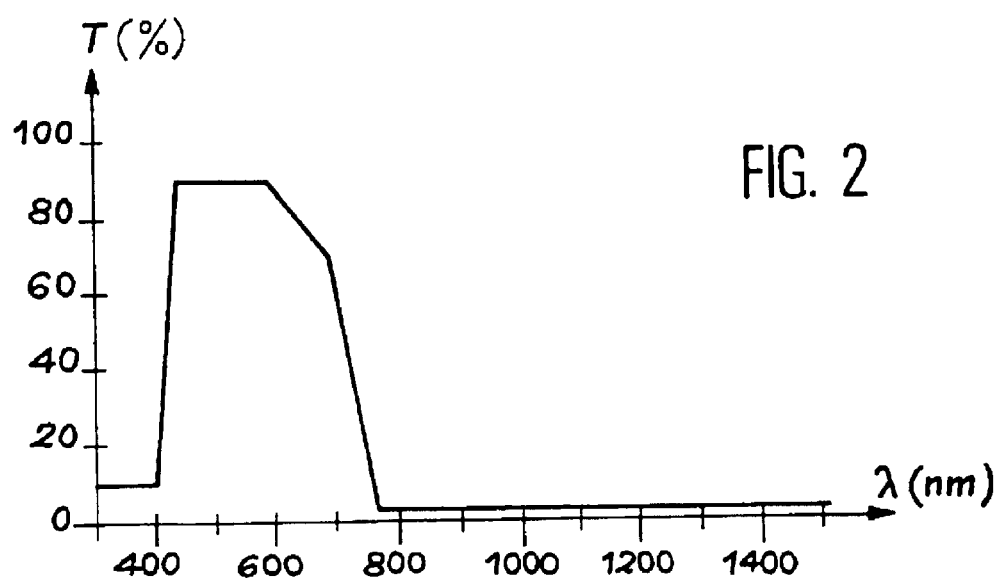
FIG. 2 shows a transmission window in the visible range.

The following values were used as a starting point;

$T \leq 0.1$ for $\lambda \leq 400$ nm $T \geq 0.9$ for $440 \leq \lambda \leq 590$ nm $T = 0.7$ for $\lambda = 690$ nm $T \leq 0.03$ for $\lambda > 770$ nm This set of target values describes a transmission window that is shown diagrammatically in FIG. 2. In this figure, T(%) represents the transmission in %, and $\lambda$ represents the wavelength in nm. They attempted to find it by calculation by superposing alternate thin layers of $SiO_2$ and $TiO_2$.

For all the architectures mentioned below, thicknesses are given as geometric thicknesses. This writing convention was explained previously.

They looked for a stack with a transmission window between about 450 and 750 nm. They started from the Air/N×(0.5L/H/0.5L)/substrate architecture, which gives the transmission spectra shown in FIG. 9 as a function of the value of N.

In this figure, the abscissa axis represents the wavelength in nm and the axis of the y-coordinates represents the transmission in %. Reference 25 indicates the curve obtained with N=3, reference 27 with N=5 and reference 29 with N=7.

This figure shows that the growth in the number of stacks and therefore the number of layers enables a sharper transition between transmission and reflection. This phenomenon will be discussed later to determine the best compromise between the optical performance of the filter and technological production difficulties.

To try to broaden the filter rejection area, in this case between 800 and 1000 nm, a second stack can be superposed on this first stack with an offset towards longer wavelengths. To the first stack group, therefore, was added an identical second stack group, centred at a wavelength with reference $\lambda_1 = m\lambda_0$. In other words, the inventors multiplied the thicknesses of this second group by m and considered the following total stack at the wavelength with reference $\lambda_0$:

$N×(0.5L/H/0.5L)+N×(0.5$ mL/mH/$0.5$ mL)

They started by setting N=5 and the behaviour of the filter was analysed as a function of m.

Figure 10:
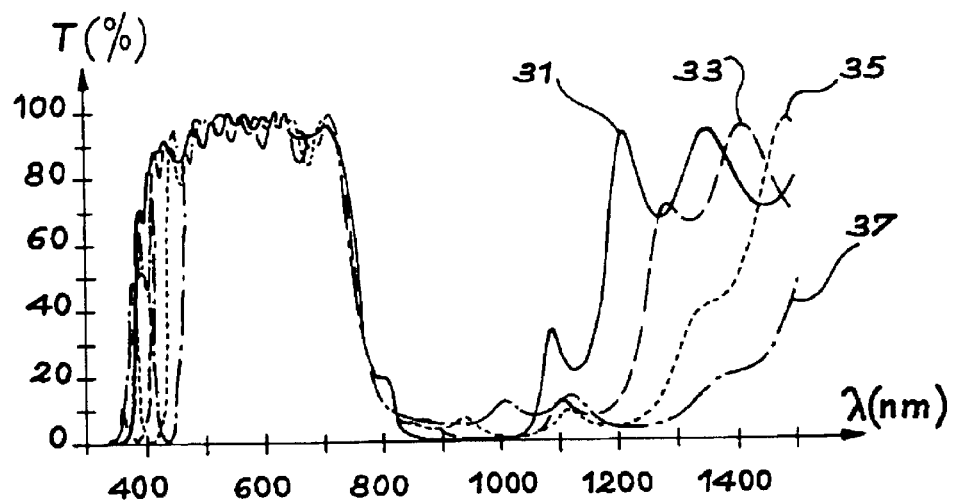
FIG. 10 shows the transmission spectra for the N×(0.5L/H/0.5L)+N×(0.5 mL/mH/0.5 mL) stack on a substrate for different values of m.

The calculated transmission spectra are shown in the appended FIG. 10. In this figure, the axis of the x-coordinates indicates the wavelength in nm and the axis of the y-coordinates represents the transmission in %. Reference 31 indicates the curve obtained with m=1.1, reference 33 the curve obtained with m=1.2, reference 35 the curve obtained with m=1.3 and reference 37 with m=1.4.

m=1.3 was thus chosen since this value gives a good compromise between a rejection area in the near infrared and visible transmission with respect to given specifications.

This choice is not overriding since it is simply a starting architecture, and the thicknesses of each layer will subsequently be modified by calculation.

This method may be continued by adding a third group offset towards longer wavelengths. Several calculations were carried out for this purpose but the results were not conclusive. The rejection zone is actually broadened, but the transmission window is considerably narrower and is too different from the initial specifications. Furthermore, the number of layers to be deposited increases which does not help to reduce treatment costs.

On the other hand, the number of layers in each group can be increased in order to give a transmission window with steeper gradients.

Choice of the Infrared Reflector

The infrared reflecting material chosen in this example is indium oxide doped with tin (ITO). The optical properties of the deposited ITO layers were modelled. The inventors attempted to find the values of the indexes n and k of the material and were thus able to calculate the reflection and transmission spectra for the total visible filter+IR filter stack.

Modelling the Optical Properties of ITO

The optical properties of deposited ITO layers were modelled. The inventors sought to find the values of the indexes n and k of the material and were thus able to calculate the reflection and transmission spectra of the total stack, in other words visible filter+IR filter.

The Drude model takes account of the presence of free carriers in reflecting materials, and particularly metals. When used in conjunction with the Lorentz model that takes account of the presence of carriers bonded in the dielectric materials, it can be used to model the optical properties of materials such as ITO. The material indexes n and k were calculated, followed by the reflection and transmission spectra, from the dielectric function derived from this model.

The method used was as follows: initial values were chosen for the $\gamma$ and $\overline{\omega}\rho$ parameters of the Drude model of dielectric function equations, and then n and k for the modelled layers, and R and T for the layer/substrate assembly were calculated. Digital minimization using the least squares method converges towards the model parameters such that the calculated and experimental spectra are superposed optimally.

The thickness of the layer was also determined by calculation and was then compared with the measurements. These final parameters gave a dispersion spectrum for the values of n and k that was used to extrapolate optical properties of the layer at an arbitrary thickness. Several different natures of ITO were thus modelled.

Figure 3:
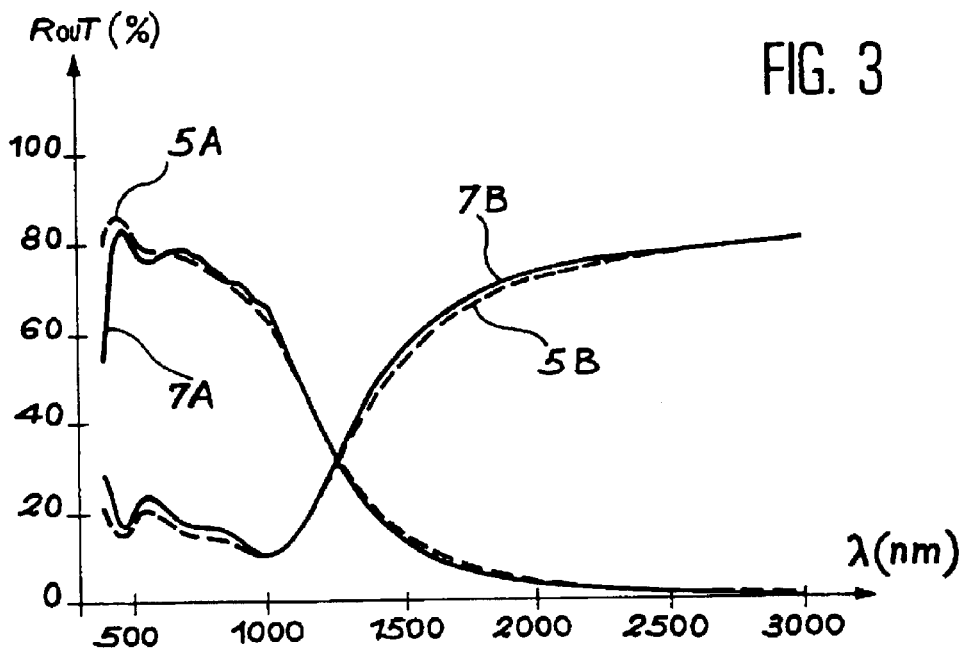
FIG. 3 shows experimental and modelled reflection and transmission spectra for a 250 nm thick ITO film deposited on a glass substrate.

The appended FIG. 3 shows superposition between experimental spectra in reflection and transmission, and recalculated or modelled values of one of these spectra. In this figure, the axis of the x-coordinates represents the wavelength $\lambda$ in nm, the axis of the y-coordinates represents the transmission or reflection in %. In this figure, the curves with references 5a and 5b represent the transmission and reflection spectra calculated by the Drude model, and the curves with references 7a and 7b represent respectively the transmission and reflection spectra obtained according to the invention.

It can be seen that there is a good agreement between experiment and calculation, particularly in the infrared part of the spectrum.

The simulation of the range of the shortest wavelengths is not as good, probably because the absorption of the glass substrate is underestimated. Furthermore, the calculation does not take account of the beginning of absorption of the material at the highest energies, close to its "gap". Initially, this visible absorption was ignored in predicting the thickness of the reflector necessary for making the filter. Subsequently, when the stack was deposited, it was confirmed that this absorption is negligible.

Study of Deposition Parameters of the ITO Layer: Influence of Annealing

Indium oxide doped with tin was deposited by magnetron cathode sputtering onto glass, starting from a sintered target with a composition of 10% by weight of tin oxide in $In_2O_3$. The optical quality of this oxide deposited as a thin layer depends on the oxygen content in the film and its crystalline state.

Figure 11:
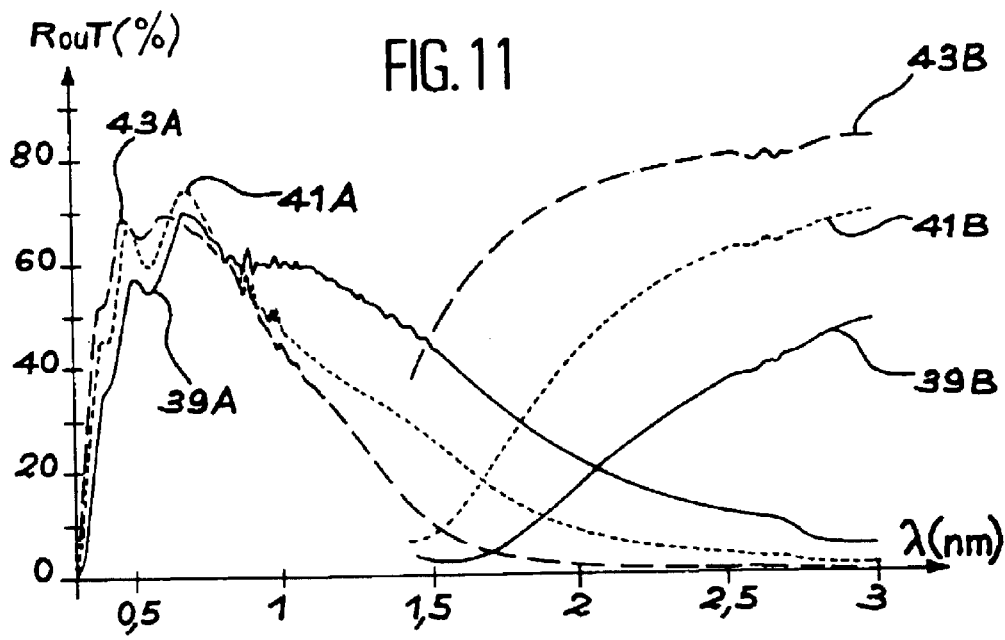
FIG. 11 shows the effect of annealing an ITO layer on the optical properties of this layer.

A given percent of oxygen has to be added into the container during deposition to retain the same stoechiometry as for the solid oxide. The appended FIG. 11 shows the effect of annealing an ITO layer on the optical reflection and transmission properties of this layer.

In this figure, the axis of the x-coordinates indicates the wavelength $\lambda$ in nm, and the axis of the y-coordinates indicates the reflection or transmission in percent. The references 39a and 39b indicate the transmission and reflection spectra respectively for ITO without annealing, and references 41A and 41B indicate the transmission and reflection spectra respectively for ITO with annealing at 200° C., and references 43A and 43B indicate the transmission and reflection spectra respectively for ITO with annealing at 300° C. These spectra were obtained after optimisation of the oxygen content.

Heat treatment at 200° C. is not sufficient to meet the specifications for the infrared filter. At 300° C., oxygen becomes 80% reflecting in infrared and the cut-off wavelength is equal to 1.3 $\mu$m. The optical properties of this material are then optimised.

Quantitative Expression of the Specifications Given Above

The specifications relative to filter performance are 5 in number. Table 3 below lists the values to be achieved and those obtained with the doped glass filter of the prior art.

TABLE 3

Desired specifications compared with the performance obtained by the doped glass filter unit

| Definition | Desired specifications | Doped glass filter |
| --- | --- | --- |
| Radiant energy RE | $\leq 4.5$ mW/m$^2$ · Lux | 2.5 to 4 |
| Average visible transmission $T_{VIS}$ | $\geq 60$ | 61.1 |
| Colour temperature $T_{COUL}$ | between 3500 and 4000 K | 3583 |
| Colour rendering index CRI or $R_A$ | $\geq 90$ | 96.9 |
| $R_9$ | $\geq 50$ | 82.9 |

Determining the Different Layers of the Accepted Architecture

The inventors have studied the performance of the stack as a function of the thickness of ITO. For each thickness value, the dielectric part was recalculated in order to get as close as possible to the desired specifications and above all to restrict transmission oscillation effects in the visible part of the spectrum.

The thicknesses of each layer were thus recalculated but remain inter-linked. Indeed, the multiplying coefficients of the two groups were calculated relative to the reference wave length. Finally, after this optimisation, the 5 previous magnitudes were recalculated.

Figure 12:
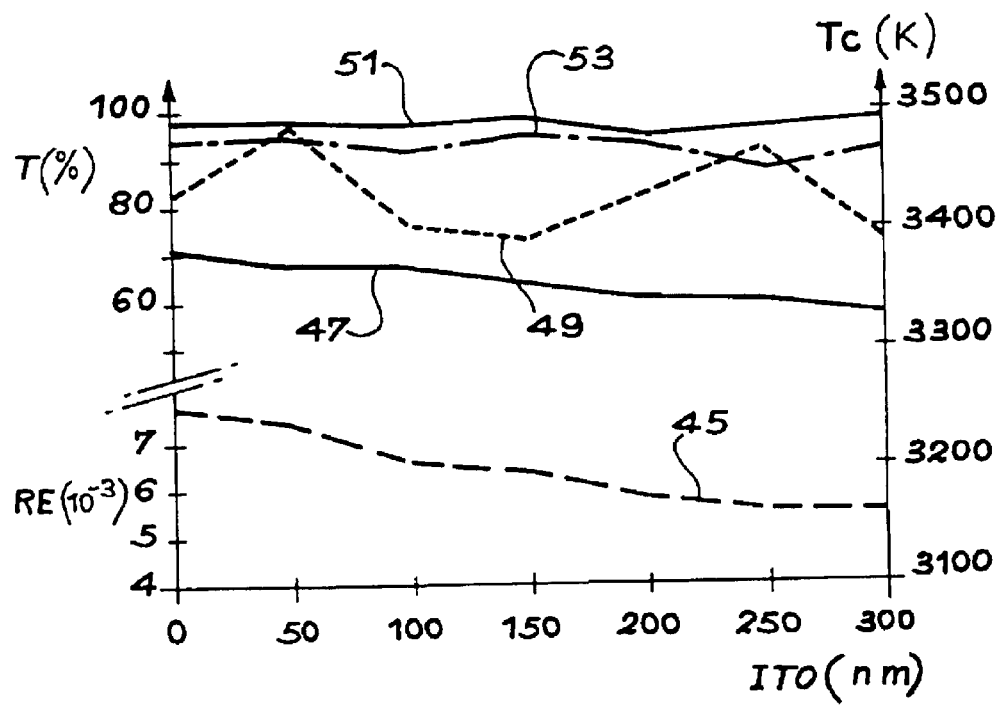
FIG. 12 shows a parametric study of different specifications as a function of the thickness of the ITO with two stack groups repeated 5 times according to a 5×(0.65L/3H/0.65L)+5×(5H/L/5H)/ITO/Glass architecture.

The results obtained are given in the appended FIG. 12. In this figure, the axis of the x-coordinates represents the ITO thickness in nm, the axis of the left hand y-coordinates represents in the lower part the radiant energy in mW/m$^2$.Lux, and in the upper part the transmission percentage and the axis of the right hand y-coordinates represents the colour temperature in K.

As a function of the thickness of the ITO layer, the reference 45 indicates the radiant energy RE variation curve, the reference 47 indicates the transmission T variation curve in the visible, the reference 49 indicates the variation in colour transmission Tc, the reference 51 indicates the variation in the colour rendering index Ra, and the reference 53 indicates the variation in the colour rendering index in the red $R_9$.

The two magnitudes of priority interest are the radiant energy and the average visible transmission. It is noted that they go in the reverse direction. Indeed, the RE value is diminished by increasing the ITO thickness, which entails reducing the IR transmission, which is therefore accompanied by a reduction in visible transmission. In this way, for an ITO thickness of 250 nm, the low visible transmission limit, i.e. 60%, is reached when the radiant energy is still much above 5.

The objectives are not reached with the multi-layer dielectric+aforementioned ITO stack, the initial solution has thus been modified.

Figure 9:
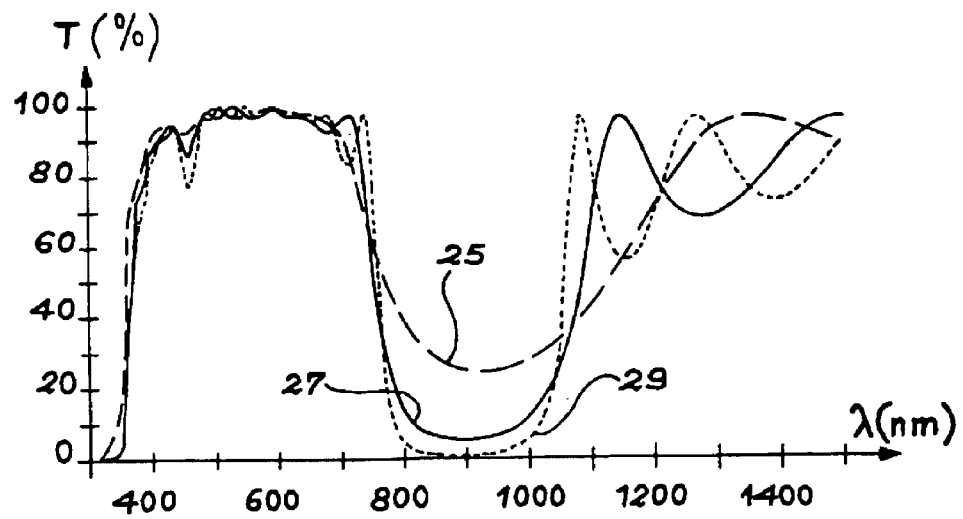
FIG. 9 shows the transmission of a stack N×(0.5 L/H/0.5 L) for different values of N where $\lambda_0$=880 nm.

As stated in the appended FIG. 9, by increasing the number of layers in each stack, the boundary between the transparent zone and rejection zone becomes more abrupt and the filtering of the latter more efficient. This observation is especially important as the light source is very powerful in this area.

Figure 13:
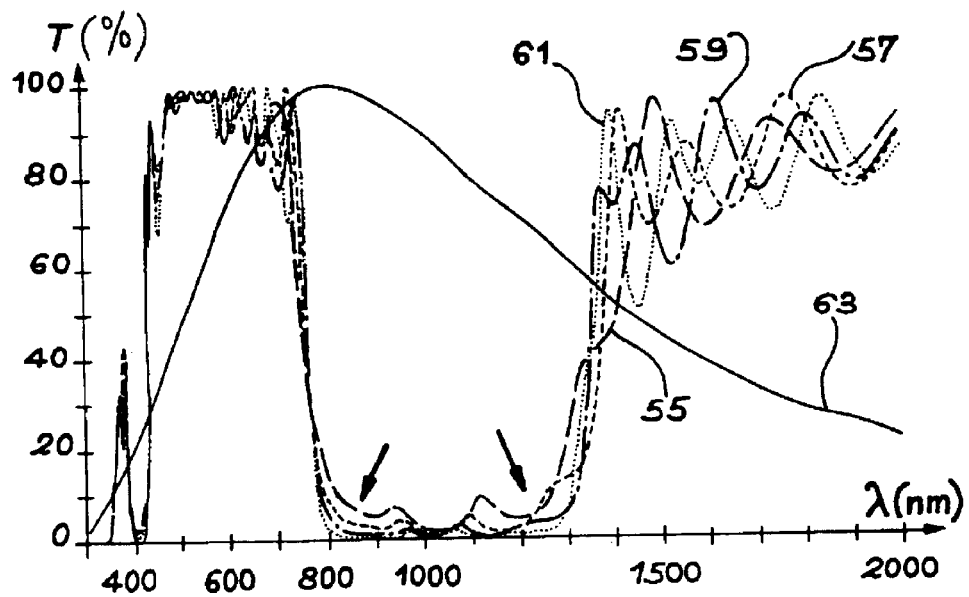
FIG. 13 is a diagram showing the improvement in the filtering performance of the architecture with the number of stacks of $SiO_2$ and $TiO_2$ films.

The number of layers per group was therefore increased so as to further reduce the transmission level between 750 and 1200 nm and therefore the radiant energy as the appended FIG. 13 shows.

This figure shows the improvement in the filtering performance of the architecture with the number of stacks. The axis of the x-coordinates represents the wave length $\lambda$ in nm and the axis of the y-coordinates the percentage transmission. The references 55, 57, 59 and 61 indicate respectively the curves obtained with N=5, N=6, N=7 and N=8. The reference 63 indicates the emission spectrum of the source lamp and the arrows indicate the magnitude of the radiant energy.

To improve the solution, an additional degree of freedom was necessary by leaving the thicknesses of each layer independently free from each other, during the calculation.

The performance of the filter particularly in the form of the visible transmission window may be improved.

Still starting from the initial architecture N×(0.5L/H/0.5L)+N×(0.65L/1.3H/0.65L)/ITO/Substrate, several parametric studies as a function of the ITO thickness were undertaken with, on each occasion, a different number of layers: N=6, 7, 8 etc. and thicknesses independently re-optimised.

To meet the specifications above, the calculations show that 33 layers are needed in total, in other words N=8.

Figure 14:
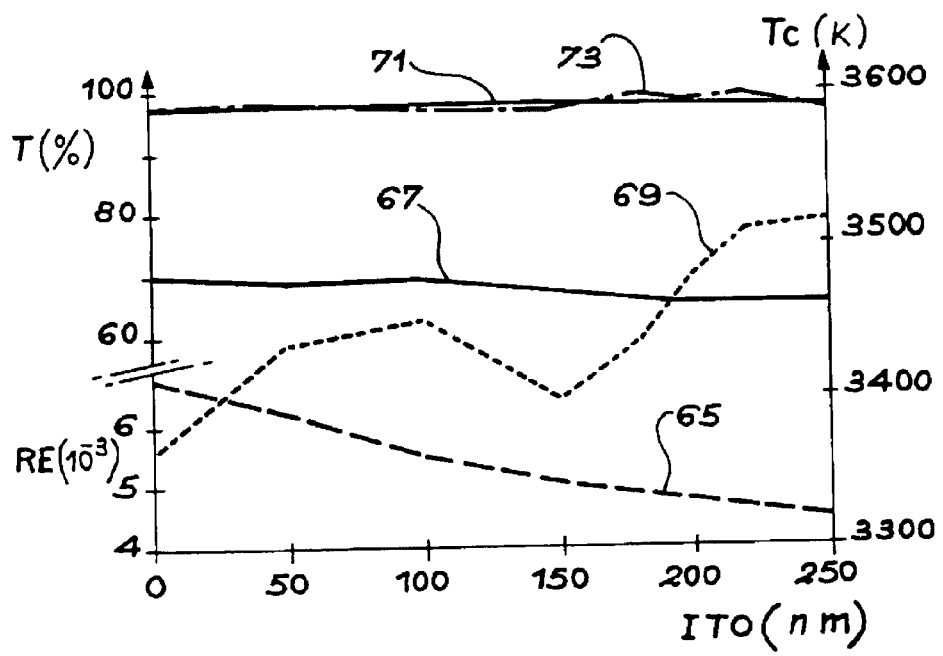
FIG. 14 is an illustration of a parametric study of different specifications as a function of the thickness of ITO with a coating forming an interference filter including two stack groups repeated 8 times in an 8×(0.5L/H/0.5L)+8×(0.65L/1.3H/0.65L)/ITO/Glass architecture.

The parametric study, leading to this solution and giving the necessary ITO thickness, is proposed in the appended FIG. 14. In this figure, the axis of the x-coordinates represents the ITO thickness in nm, the axis of the left hand y-coordinates represents in its lower part, the radiant energy in mW/m$^2$.Lux, and in its upper part, the percentage transmission and the axis of the right hand y-coordinates represents the colour temperature in K.

As a function of the ITO layer thickness, the reference 65 indicates the radiant energy RE variation curve, the reference 67 indicates the transmission T variation curve in the visible, the reference 69 indicates the variation in colour transmission Tc, the reference 71 indicates the variation in the colour rendering index Ra, and the reference 73 indicates the variation in the colour rendering index in the red $R_9$ An ITO thickness of 250 nm makes it possible to reach a radiant energy of less than or equal to 4.5.

All the specifications are then met since we have:
RE=4.45, $T_{COUL}$=3514, $T_{VIS}$=65.3, $R_A$=97.3, $R_9$=97.0.

Figure 15:
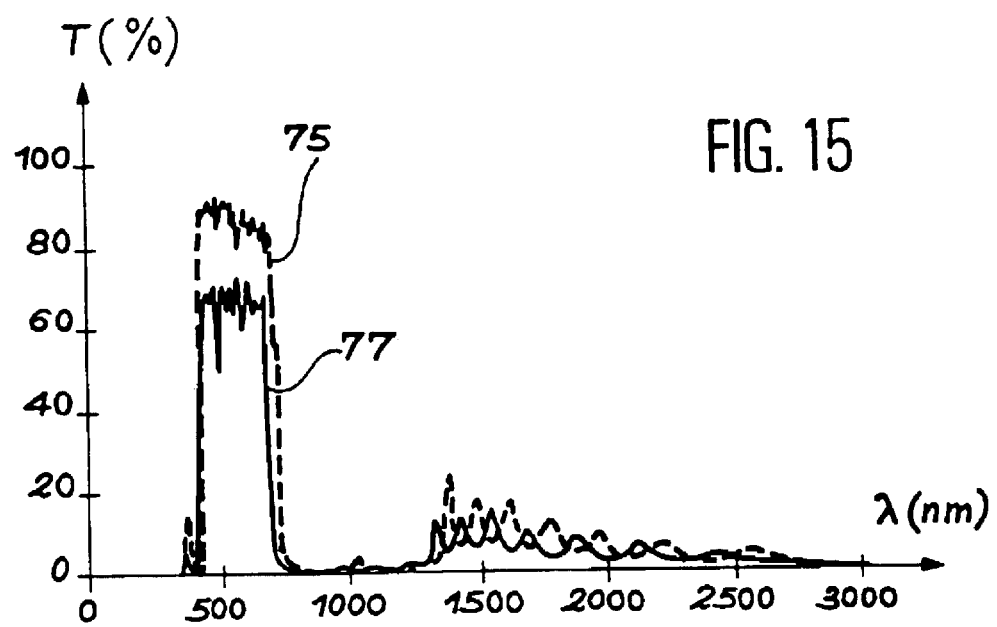
FIG. 15 represents the theoretical transmission spectrum of the filter of this invention, and the spectrum obtained experimentally, for a coating forming an $SiO_2/TiO_2$ interference filter, for comparison.
Figure 16:
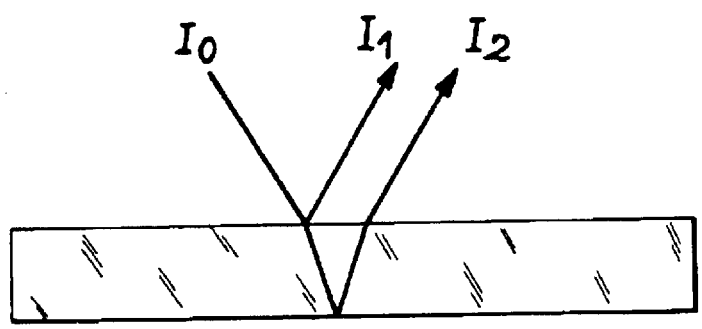
FIG. 16 is a diagram showing multiple reflections of light through a thin transparent layer.

The theoretical transmission spectrum is proposed in the appended FIG. 15. This figure is described below.

Manufacturing the Filter of the Present Invention

The Substrate

Trapezium shaped substrates are made of standard glass. This makes it possible to field test a set of 6 parts assembled around a lamp source, under operation conditions.

Figure 4:
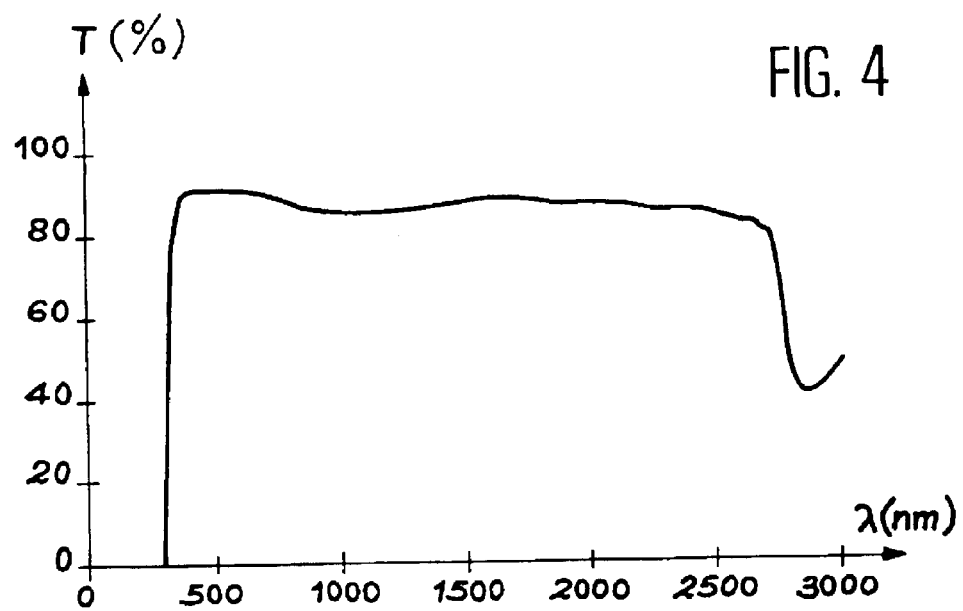
FIG. 4 shows a transmission spectrum for a 2 mm thick uncoated glass substrate.

This glass was characterised in ellipsometry and in transmission. It is 2 mm thick and the transmission spectrum of an uncoated sample is proposed in the appended FIG. 4. In this figure T represents the percentage transmission and λ the wavelength in nm.

Of these characteristics, the optical properties n and k have been extracted in order to calculate the total transmission spectrum of the filter on this substrate accurately.

The Deposit

Initially, the ITO layer is deposited on the glass substrate by reactive magnetron cathode sputtering. It is annealed at 300° C. under atmosphere $N_2$ for 1 hour. The transmission and reflection spectra are measured in order to verify that ITO has the same optical characteristics.

The $SiO_2/TiO_2$ stack is then deposited by evaporation as previously described. The layer coating speed is controlled by a quartz balance which drives the ion and electron guns. Depositing the 33 dielectric layers takes about 6 hours.

The stack obtained is given in table 4 below:

TABLE 4

Stack obtained

| Layer | Material | Thickness (nm) |
|---|---|---|
| 34 | $SiO_2$ | 64 |
| 33 | $TiO_2$ | 85 |
| 32 | $SiO_2$ | 155 |
| 31 | $TiO_2$ | 89 |
| 30 | $SiO_2$ | 147 |
| 29 | $TiO_2$ | 87 |
| 28 | $SiO_2$ | 144 |
| 27 | $TiO_2$ | 87 |
| 26 | $SiO_2$ | 153 |
| 25 | $TiO_2$ | 85 |
| 24 | $SiO_2$ | 145 |
| 23 | $TiO_2$ | 91 |
| 22 | $SiO_2$ | 149 |
| 21 | $TiO_2$ | 91 |
| 20 | $SiO_2$ | 157 |
| 19 | $TiO_2$ | 94 |
| 18 | $SiO_2$ | 169 |
| 17 | $TiO_2$ | 112 |
| 16 | $SiO_2$ | 189 |
| 15 | $TiO_2$ | 121 |
| 14 | $SiO_2$ | 191 |
| 13 | $TiO_2$ | 125 |
| 12 | $SiO_2$ | 193 |
| 11 | $TiO_2$ | 123 |
| 10 | $SiO_2$ | 192 |
| 9 | $TiO_2$ | 124 |
| 8 | $SiO_2$ | 199 |
| 7 | $TiO_2$ | 124 |
| 6 | $SiO_2$ | 197 |
| 5 | $TiO_2$ | 128 |
| 4 | $SiO_2$ | 190 |
| 3 | $TiO_2$ | 119 |
| 2 | $SiO_2$ | 172 |
| 1 | ITO | 250 |
| Substrate | Glass | |

Experimental Results—Different Parameter Calculations

The transmission spectrum obtained on the manufactured stack is proposed in the appended FIG. 15 and superimposed on the theoretical spectrum. In this figure, the axis of the x-coordinates represents the wavelength in nm and the axis of the y-coordinates represents the percentage transmission. The reference 15 indicates the theoretical spectrum, and the reference 77 the experimental spectrum obtained.

Two things may be noted:
the visible transmission level, $T_{VIS}$=51% is less than the expected value of 65%, and
there is a slight shift of about 30 nm towards the weakest wavelengths.

As regards the first observation, it may be thought that the final $TiO_2$ is probably more absorbent than the value determined by ellipsometric measurements on individual layers. A modification of some $10^{-3}$ is enough to reduce the transmission of the complete stack by more than 10%. The means of characterisation used, at the limit of sensitivity, have not allowed k to be determined with more precision.

The shift of the transmission window towards the weakest wavelengths comes from a certain imprecision in the control of thicknesses during growth. This is confirmed by a mechanical operational measurement on the edge of the filter which shows 4.26 μm instead of the 4.49 μm expected.

An industrialist equipped with on-site optical measurement will easily be able to resolve this uncertainty margin.

Table 5 lists the values of the parameters calculated with this experimental stack. It should be noted, apart from this visible transmission problem, that all these values meet the desired specifications.

TABLE 5

Required specifications, theoretical and experimental results

| | Theoretical values | Experimental values |
|---|---|---|
| Radiant energy RE ($mW/m^2 \cdot Lux$) | 4.5 | 3.92 |
| Average visible transmission $T_{VIS}$ | 65.3% | 50.8% |
| Colour temperature $T_{COUL}$ | 3514 | 3490 |
| CRI Colour rendering index or $R_A$ (ICI standards*) | 97.3 | 97.4 |
| $R_9$ (ICI standards*) | 97.0 | 89.2 |

*International Commission on Illumination

These results show that the manufacture of such a filter is demonstrated theoretically and experimentally.

Example 2 Filter of the Present Invention wherein the Interference Filter is an $SiO_2/Si_3N_4$ Filter The $SiO_2/Si_3N_4$ filter was deposited by IDECR ("Integrated Distributed Electron Cyclotron Resonance") micro-wave plasma. The advantage of such a device is low temperature deposition. Indeed, it is possible to deposit a layer of $SiO_2$ onto a polycarbonate substrate presenting good optical qualities. Furthermore, the geometrical configuration of this type of reactor allows deposition over large surfaces.

As for the $TiO_2/SiO_2$ pair, the indices of the single layer silicon nitride and oxide were determined. Using their dispersion spectra to calculate the transmission spectrum, the following stack of 25 layers on glass (L: $SiO_2$, H: $Si_3N_4$) was made:

6×(0.5L/H/0.5L)+6×(0.65L/1.3H/0.65L)

Figure 17:
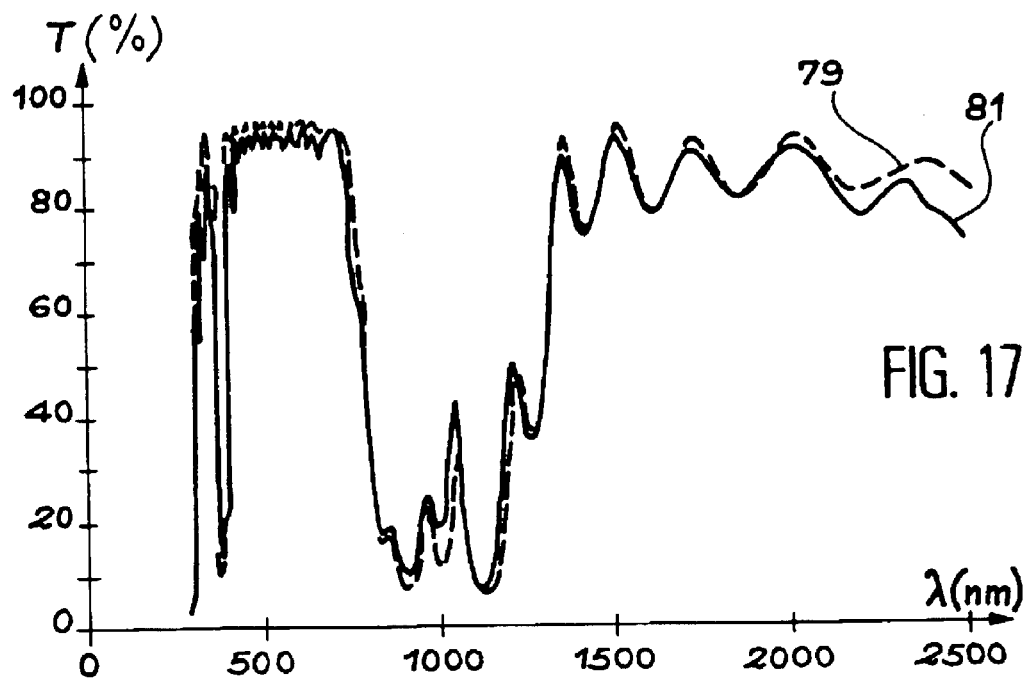
FIG. 17 represents the thermal filter transmission spectrum of this invention and the spectrum obtained experimentally for a coating forming an $SiO_2/Si_3N_4$ interference filter, for comparison.

The appended FIG. 17 lists the theoretical and experimental transmission spectra of the stack made. In this figure, the axis of the x-coordinates represents the wavelength λ in nm and the axis of the y-coordinates represents percentage transmission in the visible. The reference 79 indicates the theoretical spectrum and the reference 81 indicates the experimental spectrum.

Very good wavelength results are noted, at least in the visible part of the spectrum. This operation makes it possible, on the one hand, to validate the predictive calculations of the transmission spectra of the chosen stacks and, on the other hand, to note the good control of thicknesses during depositions. Indeed, when the thickness of the layers is controlled in situ by ellipsometry, it is possible to react on the equipment at the slightest drift.

In another experiment, the same architecture as for the $SiO_2/TiO_2$ pair was used, the performance of such a filter as a function of the ITO thickness was calculated. The measured indices of the two dielectric materials are as follows:

at 600 nm and $k = 0$: $n_{SiO2} = 1.458$
$n_{TiO2} = 1.916$

The next stack was made on a glass substrate:

8×(0.5L/*H*/0.5L)+8×(0.65L/1.3H/0.65L)/*ITO*

Figure 18:
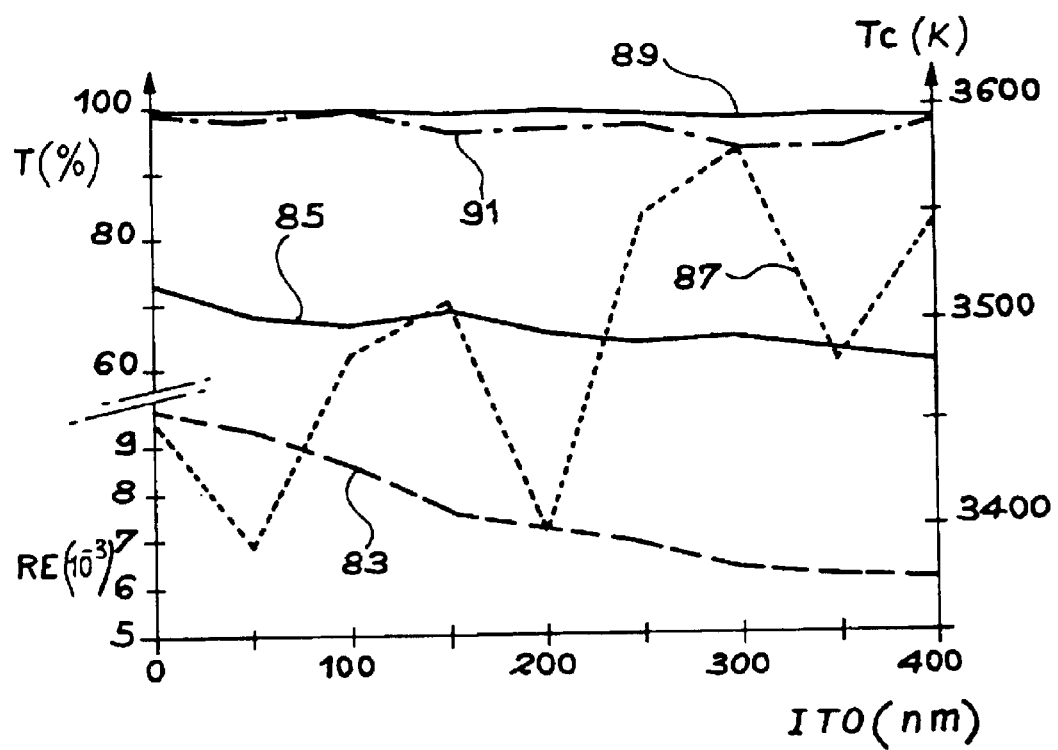
FIG. 18 shows a parametric study of the transmission performance (%) and the colour temperature (K) as a function of the thickness of an ITO layer on glass with a coating forming an $SiO_2/Si_3N4$ interference filter including two stack groups repeated 8 times with an 8×(0.65L/3H/0.65L)+8×(5H/L/5H)/ITO/Glass architecture.

The results obtained are presented in the appended FIG. 18. In this figure, the axis of the x-coordinates represents the ITO thickness in nm, the axis of the left hand y-coordinates, in its lower part represents the radiant energy in mW/m2.Lux and in its upper part the percentage transmission, and the axis of the right hand y-coordinates represents the colour temperature in K. As a function of the thickness of the ITO layer, the reference 83 indicates the radiant energy variation curve, the reference 85 indicates the transmission T variation curve in the visible, the reference 87 represents the variation in colour temperature Tc, the reference 89 indicates the variation in the colour rendering index RA and the reference 91 indicates the variation in the colour rendering index in the red $R_9$.

It may be noted that for an ITO thickness of 400 nm, a visible transmission of close to 60% but a radiant energy of 6.12 is obtained.

It was foreseeable that the performance of such a filter would be inferior to that of the $SiO_2/TiO_2$ stack for the same number of layers since the index contrast of $SiO_2/Si_3N_4$ pair is clearly lower: Δn about equal to 0.5 to 600 nm. The performance of this filter may be improved, for example by increasing the number of curves.

Conclusion

The inventors have determined an architectural layering allowing specifications required in the visible range to be met. In the examples, they chose in particular the pair of dielectric materials with a very high index contrast $TiO_2/SiO_2$. After characterising individual layers, they defined the growth method and the deposition parameters.

The second part of this work consisted in defining and depositing an infrared reflecting material allowing any radiation after 1.5 μm to be filtered and not disturbing the optical properties of the dielectric filter. ITO meets these specifications. They determined the deposition parameters and applied heat treatment after deposition, in order to optimise the material.

For the other explored path $SiO_2/Si_3N_4$ deposited by plasma, the calculated and made stacks are not sufficiently efficient because of the low index contrast. Increasing the number of layers may allow the filters to be improved.

A model was made and then characterised. The results obtained are not very different from what was expected. Indeed, a lower transmission level in the visible range and a slight spectral shift of the filter response were observed. An industrialist with plant equipped with on-site characterisation instruments allowing him to act on the deposition parameters during growth will be able to meet the required specifications exactly.

What is claimed is:

1. A heat filter, comprising:
    a substrate;
    at least one layer of a infrared reflecting material; and
    a coating forming an interference filter in the visible range, said coating including at least a first and second stack group, said first stack group including an alternation of a first film and of a second film repeated N times and said second stack group including an alternation of a third film and of a fourth film repeated N times, the first and/or the second film or films being differentiated from the third and/or the fourth film or films respectively by its/their thickness, the first and third films having a thickness L or a multiple of L and being constituted by a first material having a refractive index $n_1$, and the second and fourth films having a thickness H or a multiple of H and being constituted by a second material having a refractive index $n_2$, wherein
    N is a whole number $\geq 3$ and H and L are geometric thicknesses, and wherein N, H, L, $n_1$ and $n_2$ are such that the coating forming an interference filter has a transmission window located between 400 and 800 nm, wherein
    said first stack group has an alternation of 0.5L/H/0.5L type, repeated 8 times.

2. A heat filter according to claim 1, wherein the layer of infrared reflecting material coats at least one surface of the substrate, and the coating forming an interference filter in the visible range coats said layer of infrared reflecting material.

3. A filter according to claim 1, wherein the infrared reflecting material is a transparent conducting oxide.

4. A filter according to claim 1, wherein the infrared reflecting material is tin doped indium oxide.

5. A filter according to claim 4, wherein the tin doped indium oxide has an Sn/In ratio from about 9% to about 11% by weight.

6. A filter according to claim 5, wherein the first material is $SiO_2$ and wherein the second material is $TiO_2$.

7. A filter according to claim 1, additionally said second stack group having an alternation of 0.65L/1.3H/0.65L type, repeated 8 times.

8. A filter according to claim 5, wherein the first material is $SiO_2$ and wherein the second material is $Si_3N_4$.

9. A heat filter according to claim 1, wherein the substrate is a glass or plastic substrate.

10. A heat filter, comprising:
    a glass substrate;
    a layer of indium oxide doped with tin (ITO); and
    a coating forming an interference filter in the visible range, said coating including two different stack groups of films of $SiO_2$ and films of $TiO_2$, wherein each stack group has an alternation of films of $SiO_2$ and films of $TiO_2$, repeated 8 times, said filter having the following structure:

| Layer | Material | Thickness (nm) |
|---|---|---|
| 34 | $SiO_2$ | 64 |
| 33 | $TiO_2$ | 85 |
| 32 | $SiO_2$ | 155 |
| 31 | $TiO_2$ | 89 |
| 30 | $SiO_2$ | 147 |
| 29 | $TiO_2$ | 87 |
| 28 | $SiO_2$ | 144 |
| 27 | $TiO_2$ | 87 |
| 26 | $SiO_2$ | 153 |
| 25 | $TiO_2$ | 85 |
| 24 | $SiO_2$ | 145 |
| 23 | $TiO_2$ | 91 |
| 22 | $SiO_2$ | 149 |
| 21 | $TiO_2$ | 91 |
| 20 | $SiO_2$ | 157 |
| 19 | $TiO_2$ | 94 |
| 18 | $SiO_2$ | 169 |
| 17 | $TiO_2$ | 112 |
| 16 | $SiO_2$ | 189 |
| 15 | $TiO_2$ | 121 |
| 14 | $SiO_2$ | 191 |
| 13 | $TiO_2$ | 125 |
| 12 | $SiO_2$ | 193 |
| 11 | $TiO_2$ | 123 |
| 10 | $SiO_2$ | 192 |
| 9 | $TiO_2$ | 124 |
| 8 | $SiO_2$ | 199 |
| 7 | $TiO_2$ | 124 |
| 6 | $SiO_2$ | 197 |
| 5 | $TiO_2$ | 128 |
| 4 | $SiO_2$ | 190 |
| 3 | $TiO_2$ | 119 |
| 2 | $SiO_2$ | 172 |
| 1 | ITO | 250 |
| Substrate | Glass. | |

11. A heat filter according to claim 1 wherein said heat filter is implemented in one of a lamp, an office lamp, an optical fiber lighting system, a glazing, an optical projection system, and a bulb.

12. A heat filter according to claim 1, wherein said heat filter is implemented in surgical lighting or an examination lamp.

13. A heat filter, comprising:
a substrate;
at least one layer of a infrared reflecting material; and
a coating forming interference filter in the visible range, said coating including at least a first and second stack group, said first stack group including an alternation of a first film and of a second film repeated N times and said second stack group including an alternation of a third film and of a fourth film repeated N times, the first and/or the second film or films being differentiated from the third and/or the fourth film or films respectively by its/their thickness, the first and third films having a thickness L or a multiple of L and being constituted by a first material having a refractive index $n_1$, and the second and fourth films having a thickness H or a multiple of H and being constituted by a second material having a refractive index $n_2$, wherein
N is a whole number $\geq 3$ and H and L are geometric thicknesses, and wherein N, H, L, $n_1$ and $n_2$ are such that the coating forming an interference filter has a transmission window located between 400 and 800 nm, wherein
said first stack group has an alternation of 0.5L/H/0.5L type, repeated 6 times.

14. A heat filter according to claim 13, wherein the layer of infrared reflecting material coats at least one surface of the substrate, and the coating forming an interference filter in the visible range coats said layer of infrared reflecting material.

15. A filter according to claim 13, wherein the infrared reflecting material is a transparent conducting oxide.

16. A filter according to claim 13, wherein the infrared reflecting material is tin doped indium oxide.

17. A filter according to claim 16, wherein the tin doped indium oxide has an Sn/In ratio from about 9% to about 11% by weight.

18. A filter according to claim 17, wherein the first material is $SiO_2$ and wherein the second material is $TiO_2$.

19. A filter according to claim 17, wherein the first material is $SiO_2$ and wherein the second material is $Si_3N_4$.

20. A filter according to claim 13, additionally said second stack group having an alternation of 0.65L/1.3H/0.65L type, repeated 6 times.

21. A heat filter according to claim 13, wherein the substrate is a glass or plastic substrate.

22. A heat filter according to claim 13, wherein said heat filter is implemented in one of a lamp, an office lamp, an optical fiber lighting system, a glazing, an optical projection system, and a bulb.

23. A heat filter according to claim 13, wherein said heat filter is implemented in surgical lighting or an examination lamp.

24. A heat filter, comprising:
a glass substrate;
at least one layer of a infrared reflecting material composed of a layer of tin doped indium oxide; and
a coating forming an interference filter in the visible range, said coating including a stack in which films of $SiO_2$ and films of $TiO_2$ alternate, the stack starting with a film of $SiO_2$ deposited on the ITO layer and ending with a film of $SiO_2$ in contact with the atmosphere, said stack including 17 films of $SiO_2$ and 16 films of $TiO_2$.

25. A process for manufacturing a heat filter, comprising:
providing a substrate,
depositing on at least one surface of said substrate a layer of infrared reflecting material,
depositing on said layer of infrared material a coating forming an interference filter in a visible range, said coating including at least a first and second stack group, said first stack group including an alternation of a first film and of a second film repeated N times and said second stack group including an alternation of a third film and of a fourth film repeated N times, the first and/or the second film or films being differentiated from the third and/or the fourth film or films respectively by its/their thickness, the first and third films having a thickness L or a multiple of L and being constituted by a first material having a refractive index $n_1$, and the second and fourth films having a thickness H or a multiple of H and being constituted by a second material having a refractive index $n_2$, wherein
N is a whole number $\geq 3$ and H and L are geometric thicknesses, and wherein N, H, L, $n_1$ and $n_2$ are such that the coating forming an interference filter has a transmission window located between 400 and 800 nm, wherein
said first stack group has an alternation of 0.5L/H/0.5L type, repeated 8 times.

26. The process of claim 25, wherein the step of depositing the infrared reflecting material includes depositing tin doped indium oxide by magnetron cathode sputtering on the substrate.

27. The process of claim 26, wherein the magnetron cathode sputtering is carried out from a sintered target having a composition from about 9% to about 11% by weight of tin oxide in $In_2O_3$.

28. The process of claim 26, further comprising: annealing the infrared reflecting material deposited on the substrate.

29. The process of claim 25, wherein the step of depositing the coating forming the interference filter is a performed by vacuum evaporation or cathode sputtering.

30. The process of claim 25, wherein the step of depositing the coating forming the interference filter is performed by reactive assisted reactive evaporation.

31. The process of claim 25, wherein the step of depositing the coating forming the interference filter is performed by plasma deposition.

32. A process for manufacturing a heat filter, comprising:

providing a substrate, depositing on at least one surface of said substrate a layer of infrared reflecting material, depositing on said layer of infrared material a coating forming an interference filter in a visible range, said coating including at least a first and second stack group, said first stack group including an alternation of a first film and of a second film repeated N times and said second stack group including an alternation of a third film and of a fourth film repeated N times, the first and/or the second film or films being differentiated from the third and/or the fourth film or films respectively by its/their thickness, the first and third films having a thickness L or a multiple of L and being constituted by a first material having a refractive index $n_1$, and the second and fourth films having a thickness H or a multiple of H and being constituted by a second material having a refractive index $n_2$, wherein N is a whole number $\geq 3$ and H and L are geometric thicknesses, and wherein N, H, L, $n_1$ and $n_2$ are such that the coating forming an interference filter has a transmission window located between 400 and 800 nm, wherein said first stack group has an alternation of 0.5L/H/0.5L type, repeated 6 times.

33. The process of claim 32, wherein the step of depositing the infrared reflecting material includes depositing tin doped indium oxide by magnetron cathode sputtering on the substrate.

34. The process of claim 33, wherein the magnetron cathode sputtering is carried out from a sintered target having a composition from about 9% to about 11% by weight of tin oxide in $In_2O_3$.

35. The process of claim 33, further comprising:

annealing the infrared reflecting material deposited on the substrate.

36. The process of claim 32, wherein the step of depositing the coating forming the interference filter is performed by vacuum evaporation or cathode sputtering.

37. The process of claim 32, wherein the step of depositing the coating forming the interference filter is performed by reactive assisted reactive evaporation.

38. The process of claim 32, wherein the step of depositing the coating forming the interference filter is performed by plasma deposition.

* * * * *